April 15, 1958  H. R. KLOCKNER  2,830,669
BLADE-PITCH-REGULATING MEANS FOR THE ROTORS
OF SUSTAINING-ROTOR-EQUIPPED AIRCRAFT
Filed June 3, 1955  2 Sheets-Sheet 1
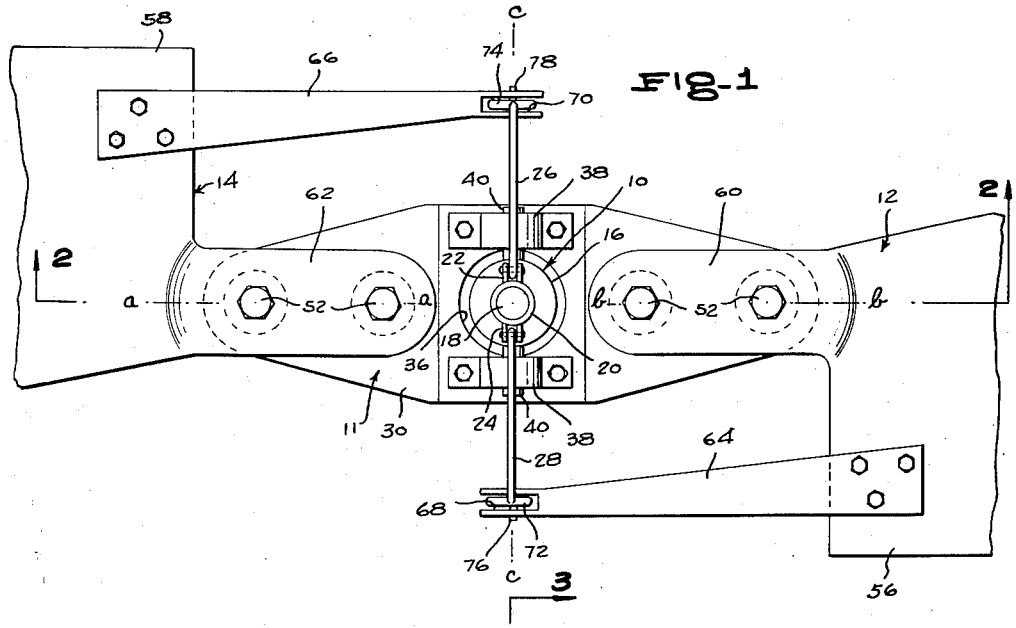
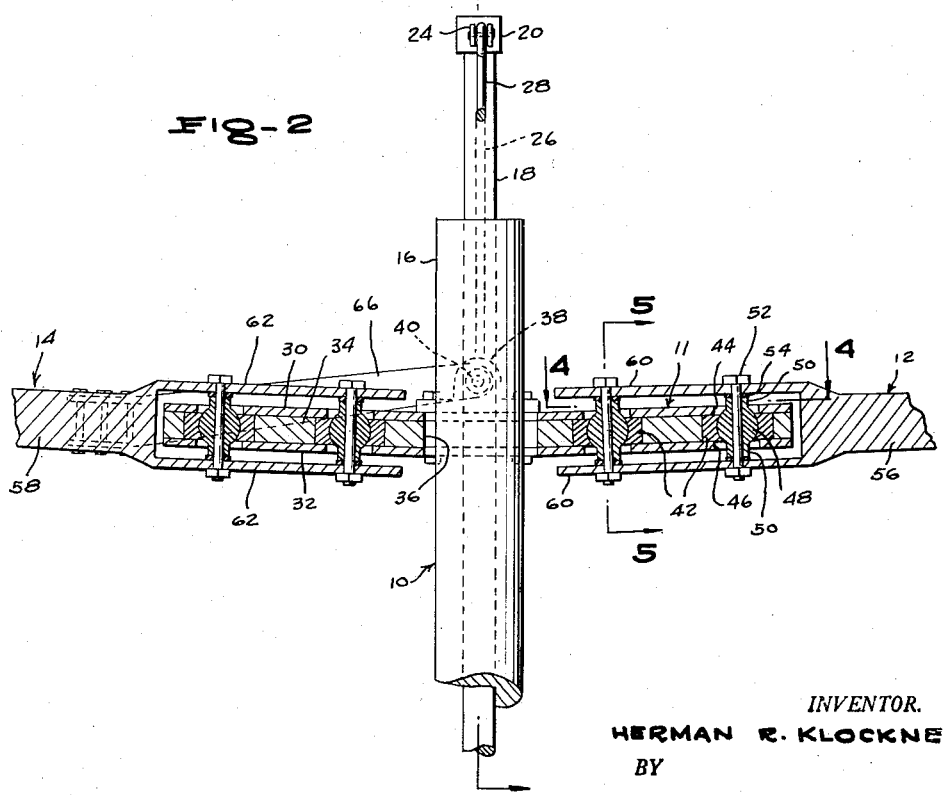
INVENTOR.
HERMAN R. KLOCKNER
BY
McMorrow, Berman + Davidson
ATTORNEYS April 15, 1958  H. R. KLOCKNER  2,830,669
BLADE-PITCH-REGULATING MEANS FOR THE ROTORS
OF SUSTAINING-ROTOR-EQUIPPED AIRCRAFT
Filed June 3, 1955  2 Sheets-Sheet 2
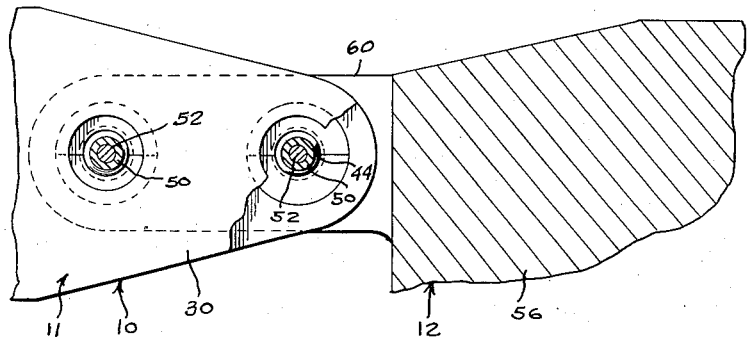
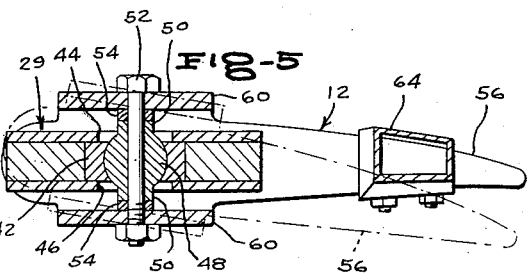
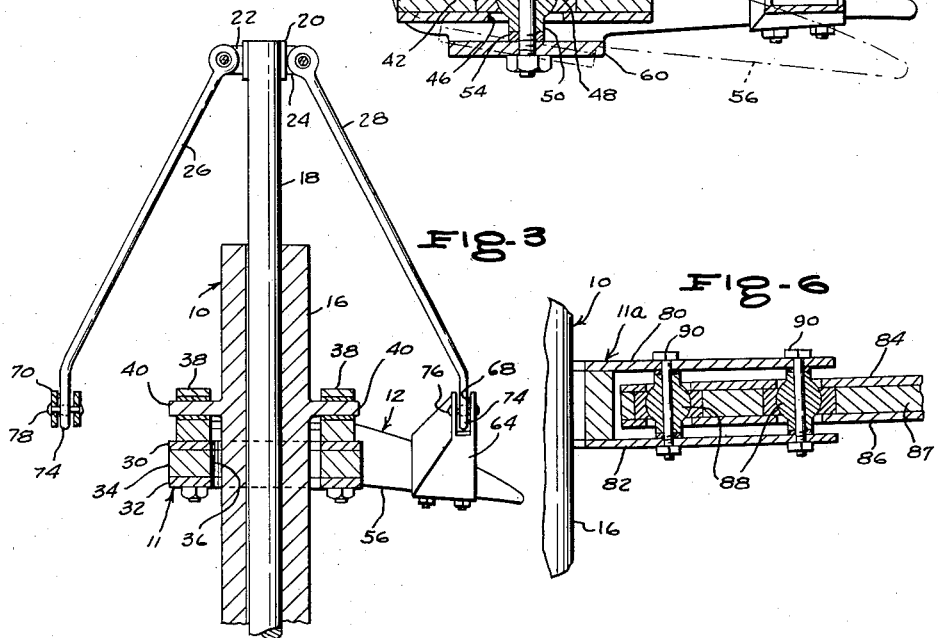
INVENTOR.
HERMAN R. KLOCKNER
BY
McMorrow, Berman & Davidson
ATTORNEYS United States Patent Office 2,830,669
Patented Apr. 15, 1958

2,830,669

BLADE-PITCH-REGULATING MEANS FOR THE ROTORS OF SUSTAINING-ROTOR-EQUIPPED AIRCRAFT

Herman R. Klockner, New Castle, Pa.

Application June 3, 1955, Serial No. 512,944

3 Claims. (Cl. 170—160.42)

This invention relates to sustaining-rotor-equipped aircraft, and in particular has reference to a rotor construction for an aircraft of this type having incorporated therein an improved blade-pitch-regulating mechanism.

The broad object of the present invention is to provide a generally improved means for regulating the pitch of the rotor blades, and more particular objects are to simplify the pitch-adjusting mechanism by the use of a comparatively small number of machined parts, and the use of standard spherical bearings, having the advantage of measurably lowering the manufacturing cost without sacrifice of efficiency; and to combine in a unitary assembly both the connection of the blades to the rotor hub and the pitch-changing mechanism.

Other objects will appear from the following description, the claims appended thereto, and from the annexed drawing, in which like reference characters designate like parts throughout the several views, and wherein:

Figure 1 is a top plan view of a rotor formed according to the present invention, the blades being shown fragmentarily;

Figure 2 is a section on line 2—2 of Figure 1;

Figure 3 is a transverse section on line 3—3 of Figure 2;

Figure 4 is a plan section, on an enlarged scale, substantially on line 4—4 of Figure 2;

Figure 5 is a transverse section, also on an enlarged scale, on line 5—5 of Figure 2, the dotted lines showing the blade in one position to which it may be adjusted for regulating its pitch; and Figure 6 is a fragmentary view similar to Figure 2 showing a modified construction.

The rotor constituting the present invention comprises a combination of four main or primary components, these being a hub generally designated 10, a blade support plate generally designated 11, and blades respectively designated generally at 12 and 14.

Considering first the construction of the hub, this includes an upstanding hub sleeve 16, which, by means of driving connections already known in the art linking the hub in a driven relationship to the engine, not shown, of the aircraft, is rotated about its major or longitudinal axis.

Rotating with the hub is a post 18, and this extends within and is slidable axially of the hub. The post, at its upper end, projects above the upper end of the sleeve 16, and secured fixedly to the upper end of the post is a collar 20, having, at diametrically opposite locations thereon, pairs of outwardly projecting ears 22, 24 to which are pivotally connected the eyeletted upper ends of elongated, straight connecting rods 26, 28 respectively.

The blade support plate 11, as shown in Figure 1, is relatively elongated, and is of laminated formation (see Figure 2). The blade support plate includes a top plate member 30, and a bottom plate member 32, confining between them a filler or spacer plate 34. In the form of the invention shown in Figures 1–5, the support plate 11 constitutes a bearing retainer, widest at its midlength portion as shown in Figure 1, and tapering gradually from said midlength portion toward its opposite ends.

The plate members 30, 32, 34 are formed with large diameter, registering center openings, providing a center opening 36 in the blade support plate substantially greater in diameter than the outer diameter of the hub sleeve 16, so that the hub sleeve is loosely received in the blade support plate. Secured to the wide, midlength portion of the blade support plate, at opposite sides of the hub sleeve, are pillow block bearings 38, supported on the upper surface of the blade support plate and receiving trunnions 40 projecting radially, outwardly from the hub sleeve as shown in Figure 3. The trunnions are coaxially aligned, and support the blade support dependingly from the hub sleeve, for rocking of the blade support plate about an axis disposed medially between the opposite ends thereof and located above the top surface of the blade support plate, said axis extending normally to and intersecting the axis of rotation of the hub sleeve and post.

In each end portion of the filler plate member 34, there are mounted bearing inserts or bushings 42, spaced longitudinally of the blade support plate, in registration with openings 44, 46 formed in the top and bottom plate members 30, 32 respectively. Spherical bearings or ball elements 48 are mounted in the bushings for universal movement, and are integrally formed with cylindrical, coaxial extensions 50, one extension of each ball element projecting upwardly through opening 44 and the other projecting downwardly through opening 46.

The ball elements and extensions are axially bored to receive connecting bolts 52 passing through openings formed in spacers 54, that engage against the outer ends of the respective extensions 50. The purpose of the spacers as will presently appear, is to provide for maximum travel of the blades when the blade pitch is being changed.

The blades 12, 14 respectively include airfoils or bodies 56, 58. The airfoils may be of any cross sectional shape found suitable for maximum efficiency, and ordinarily, in a rotor of an aircraft of this type, the airfoils are symmetrically designed, when considered from the standpoint of their cross sectional configuration.

At their inner, hub-adjacent ends, the bodies 56, 58 are respectively formed with vertically spaced bearing retainer plates 60, 62 receiving the end portions of the bearing retainer or blade support plate 11. As shown in Figure 2, the bearing retainer plates 60, and also the bearing retainer plates 62, are spaced apart a vertical distance substantially greater than the thickness of the bearing support plate, so as to provide for maximum freedom of movement of the blades relative to the blade support plate, about the longitudinal axes A—A and B—B in Figure 1, the blades rotating or pivoting about these axes when the pitch thereof is being changed.

The connecting bolts pass through openings formed in the bearing retainer plates of the respective blades, and thus fixedly attach the blades to the opposite ends of the spherical bearings. The blades accordingly, are each connected to the bearing support plate for rotation about the axis A—A or B—B as the case may be, independently of one another, for the purpose of changing the blade pitch. This is shown to particular advantage in Figure 5, wherein the dotted lines show the blade 12 in one position to which it may be adjusted about the axis B—B when its pitch is being changed.

It will be noted, in this connection, that while the blades would be rotated in opposite directions about the pitch-changing axes A—A and B—B they are both connected to the bearing support plate for conjoint pivotal adjustment about the axis defined by the trunnions 40, 40. Further, in any position to which the bearing support plate is rocked about its connection to the sleeve 16, the blade pitch can be changed at will.

Fixedly secured to the blade bodies are elongated control arms 64, 66 respectively. These are disposed longitudinally of the blade bodies, in laterally spaced relation to the hub sleeve 16, with the outer ends of the arms terminating well outwardly from the hub sleeve, at diametrically opposite points in respect to the hub sleeves.

The outer ends of the control arms are bifurcated as at 68, 70, to receive the eyeletted, divergent ends 72, 74 of the connecting rods 28, 26 respectively, and said divergent ends of the connecting rods are connected to the control arms by spherical bearings 76, 78.

It will be noted that the connection of the convergent ends to the post 18 are such as to join the rods to the post for swinging movement about axes normal to the length of the post, while the connections of the rods to the arms are such as to join the arms to the rods for relative swinging movement about axes normal to the axes at the convergent ends of the rods.

In use of aircraft, the rotor would of course be rotated in a manner well known in the art, thus causing the blades, hub sleeves, post, and bearing support plate to rotate as a unit.

During rotation of the rotor, the blade pitch can be changed by axially shifting post 18 within the hub sleeve. Thus if the post is lowered within the hub sleeve, from the position thereof shown in the drawing, the outer ends of the arms 64, 66 will be correspondingly lowered. This drops the trailing edges of the airfoils, the blades pivoting under these circumstances about the axes A—A and B—B respectively, in opposite directions. The blade pitch is accordingly changed to any extent desired.

Coincident with or independently of the changing of the blade pitch, the blades may be rocked about an axis extending transversely thereof, defined by the trunnions 40, the blades now swinging with the bearing retainer or support plate 11.

In the form of the invention shown in Figure 6, the only change is to mount the bearing retainer and the spherical bearing elements on the blades themselves, instead of on the hub. Meanwhile, the hub still has a blade support plate 11a, comprising a top plate member 80 and a bottom plate member 82 spaced apart by a filler block. The support 11a has a center opening loosely receiving the hub sleeve 16, and it will be understood that the blade support plate 11a is pivotally connected to the hub by pillow blocks 38 and trunnions 40, in the same manner as in the first form of the invention.

In this form of the invention, the bearing retainer extends in the space between the plate members 80, 82 and includes bearing retainer plates 84, 86 which will be fixedly secured at their outer ends, now shown, to the hub-adjacent ends of the blade bodies 56, 58. The bearing retainer plates 84, 86 confine between them a filler plate member 87, having bushings in which are universally mounted spherical ball elements 88, connected by bolts 92 to the support plate members 80, 82.

In other words, in the form of the invention shown in Figure 6, the functional relationship of the parts is not changed in any respect, the blades still being connected to a blade support plate that is mounted to rock about an axis extending transversely of the blades and perpendicularly intersecting the axis of rotation of the hub sleeve. Further, the blades are connected to the blade support plate for rotation about the axes A—A and B—B, and the pitch of the blades will still be changed by elevation or lowering of the post 18, through the medium of the connecting rods 26, 28 and control arms 66, 64.

In both forms of the invention, there is the common, desirable characteristic wherein the construction is extremely simple, considering the different functions which the mechanism mounting the blade on the hub is adapted to discharge. The simplicity of the construction, resulting in a measurable reduction in manufacturing cost and a reduction in the number of working parts to a desirably low figure, derives wholly from the use of the blade-pitch-regulating mechanism serving as the connection of the blades to the hub sleeve, and derives, further, from the use of parts which are individually conventional. For example, the spherical ball elements, having their cylindrical extensions, are in and of themselves wholly conventional bearings, and need not be specially designed for installation in the rotor structure. It may be noted, in this connection, that under some circumstances, bearings other than the spherical type illustrated can be used.

As shown in Figure 3, in which the blade is illustrated at an approximately 10° or 11° pitch setting, this being the optimum setting for normal flight, the bearings 76, 78 are aligned under these conditions with the trunnions 40.

It is believed apparent that the invention is not necessarily confined to the specific use or uses thereof described above, since it may be utilized for any purpose to which it may be suited. Nor is the invention to be necessarily limited to the specific construction illustrated and described, since such construction is only intended to be illustrative of the principles, it being considered that the invention comprehends any minor change in construction that may be permitted within the scope of the appended claims.

What is claimed is:

1. In a sustaining-rotor-equipped aircraft, a rotor comprising: a rotatable hub sleeve; a post extending within and shiftable axially of the sleeve; blades angularly spaced about and extending outwardly from the sleeve; blade support means mounted on the sleeve, to rock about an axis extending transversely of the blades and perpendicularly intersecting the axis of rotation of the sleeve, said means including a blade support plate, said plate including top and bottom plate members in parallel planes and said plate members having openings aligned along lines extending normally to said planes, pins extending through the openings, and spherical bearings enclosing said pins and formed with extensions projecting in opposite directions in alignment with the pins, said pins and bearings rocking about a common axis extending longitudinally of each blade radially of the axis of rotation of the hub sleeve, the respective blades each including vertically spaced bearing retainer plates formed with openings through which the pins extend, whereby to connect the blade support plate to each blade with each blade being tiltable about an axis extending longitudinally thereof and defined by the axis of rocking movement of the respective pins; and means connected between the blades and post for effecting said tiltable adjustment of the blades responsive to axial shifting of the post within the sleeve.

2. In a sustaining-rotor-equipped aircraft, a rotor comprising: a rotatable hub sleeve; a post extending within and shiftable axially of the sleeve; blades angularly spaced about and extending outwardly from the sleeve; blade support means mounted on the sleeve, to rock about an axis extending transversely of the blades and perpendicularly intersecting the axis of rotation of the sleeve, said means including a blade support plate, said plate including top and bottom plate members in parallel planes and said plate members having openings aligned along lines extending normally to said planes, pins extending through the openings, and spherical bearings enclosing said pins and formed with extensions projecting in opposite directions in alignment with the pins, said pins and bearings rocking about a common axis extending longitudinally of each blade radially of the axis of rotation of the hub sleeve, the respective blades each including vertically spaced bearing retainer plates in overlapping relation to said top and bottom plate members and formed with openings through which the pins extend, whereby to connect the blade support plate to each blade with each blade being tiltable about an axis extending longitudinally thereof and defined by the axis of rocking movement of the respective pins; and means connected between the blades and post for effecting said tiltable adjustment of the blades responsive to axial shifting of the post within the sleeve, the bearing retainer plates of each blade embracing the blade support plate and being spaced outwardly from the plate members of the blade support plate by the bearing extensions.

3. In a sustaining-rotor-equipped aircraft, a rotor comprising: a rotatable hub sleeve; a post extending within and shiftable axially of the sleeve; blades angularly spaced about and extending outwardly from the sleeve; blade support means mounted on the sleeve, to rock about an axis extending transversely of the blades and perpendicularly intersecting the axis of rotation of the sleeve, said means including a blade support plate, said plate including top and bottom plate members in parallel planes and said plate members having openings aligned along lines extending normally to said planes, pins extending through the openings, and spherical bearings enclosing said pins and formed with extensions projecting in opposite directions in alignment with the pins, said pins and bearings rocking about a common axis extending longitudinally of each blade radially of the axis of rotation of the hub sleeve, the respective blades each including bearing retainer plates extending between said top and bottom plate members and formed with openings through which the pins extend, whereby to connect the blade support plate to each blade with each blade being tiltable about an axis extending longitudinally thereof and defined by the axis of rocking movement of the respective pins; and means connected between the blades and post for effecting said tiltable adjustment of the blades responsive to axial shifting of the post within the sleeve.

References Cited in the file of this patent

UNITED STATES PATENTS

| | | |
|---|---|---|
| 2,088,413 | Hafner | July 27, 1937 |
| 2,499,314 | Hunt | Feb. 28, 1950 |
| 2,606,621 | Neale | Aug. 12, 1952 |
| 2,663,374 | Vandermeer | Dec. 22, 1953 |
| 2,685,933 | Terzi | Aug. 10, 1954 |

FOREIGN PATENTS

| | | |
|---|---|---|
| 476,596 | Great Britain | Dec. 13, 1937 |
| 612,189 | Great Britain | Nov. 9, 1948 |